(12) United States Patent
Marchand et al.

(10) Patent No.: US 9,444,345 B2
(45) Date of Patent: Sep. 13, 2016

(54) SWITCH MODE POWER SUPPLY MODULE AND ASSOCIATED HICCUP CONTROL METHOD

(71) Applicant: Thomson Licensing, Issy de Moulineaux (FR)

(72) Inventors: Philippe Marchand, Cesson Sevigne (FR); Gerard Morizot, Cesson Sevigne (FR); Philippe Guillot, Cesson Sevigne (FR)

(73) Assignee: Thomson Licensing, Issy les Moulineaux (FR)

( * ) Notice: Subject to any disclaimer, the term of this patent is extended or adjusted under 35 U.S.C. 154(b) by 83 days.

(21) Appl. No.: 13/763,725

(22) Filed: Feb. 10, 2013

(65) Prior Publication Data

US 2013/0208511 A1 Aug. 15, 2013

(30) Foreign Application Priority Data

Feb. 10, 2012 (FR) ..................................... 12 51274

(51) Int. Cl.
*H02M 3/156* (2006.01)
*H02M 1/42* (2007.01)
(Continued)

(52) U.S. Cl.
CPC ................ *H02M 3/22* (2013.01); *H02M 1/36* (2013.01); *H02M 3/156* (2013.01); *H02M 3/335* (2013.01); *H02M 2001/0035* (2013.01); *Y02B 70/16* (2013.01)

(58) Field of Classification Search
CPC .... H02M 7/7575; H02M 3/156; H02M 1/36; H02M 3/335; H02M 1/4225; H02M 3/33507; H02M 5/4585; H02M 3/337; Y02B 70/126
USPC ................... 363/79, 80, 84, 89, 21.02–21.18
See application file for complete search history.

(56) References Cited

U.S. PATENT DOCUMENTS 5,390,100 A 2/1995 Palata
5,812,383 A * 9/1998 Majid ............... H02M 3/33523
363/19

(Continued)

FOREIGN PATENT DOCUMENTS

CN 2882068 Y 3/2007
CN 101976959 2/2011

(Continued)

OTHER PUBLICATIONS

"Off-Line SMPS Current Mode Controller with Integrated 500V Startup Cell (Latched and Frequency Jitter Mode)", Nov. 8, 2011, pp. 1-25, Nov. 8, 2011, pp. 1-25.

(Continued)

*Primary Examiner* — Timothy J Dole
*Assistant Examiner* — Sisay G Tiku
(74) *Attorney, Agent, or Firm* — Brian J. Dorini; Michael A. Pugel

(57) ABSTRACT

The invention concerns a method and device for controlling the switching operation in a switch mode power supply module. The switch mode power supply module is intended to supply power to an item of equipment. The method comprises the steps of measuring, in the switch mode power supply module, the load current and comparing the measured load current with a predefined load current threshold value, and, cyclically interrupting the switching operation if the measured load current inside the device is less than the predefined load current threshold value.

22 Claims, 5 Drawing Sheets

(51) Int. Cl.
  *H02M 3/335*  (2006.01)
  *H02M 3/337*  (2006.01)
  *H02M 5/458*  (2006.01)
  *H02M 3/22*  (2006.01)
  *H02M 1/36*  (2007.01)
  *H02M 1/00*  (2006.01)

(56) References Cited

U.S. PATENT DOCUMENTS

| | | | |
|---|---|---|---|
| 5,982,640 A * | 11/1999 | Naveed | H02M 3/33523 363/21.15 |
| 5,986,897 A * | 11/1999 | Majid | H02M 3/33515 363/21.13 |
| 5,995,384 A * | 11/1999 | Majid | H02M 3/33523 323/902 |
| 6,411,483 B1 | 6/2002 | Sarles et al. | |
| 6,788,556 B2 * | 9/2004 | Hosotani et al. | 363/21.15 |
| 6,980,444 B2 * | 12/2005 | Takahashi | H02M 3/33523 363/21.16 |
| 7,030,596 B1 | 4/2006 | Salerno et al. | |
| 7,136,292 B1 * | 11/2006 | Chan | H02M 1/36 363/21.09 |
| 7,321,223 B2 | 1/2008 | Hachiya | |
| 7,411,317 B2 | 8/2008 | Liu | |
| 7,529,105 B1 * | 5/2009 | Choi | H02M 3/33523 363/131 |
| 8,164,932 B2 * | 4/2012 | Sims et al. | 363/69 |
| 2002/0071295 A1 * | 6/2002 | Nishikawa | 363/21.15 |
| 2003/0042879 A1 | 3/2003 | Huh et al. | |
| 2003/0128555 A1 | 7/2003 | Schemmann et al. | |
| 2008/0130134 A1 | 6/2008 | Ishida et al. | |
| 2008/0130324 A1 * | 6/2008 | Choi et al. | 363/21.03 |
| 2008/0203997 A1 | 8/2008 | Foran et al. | |
| 2009/0008995 A1 * | 1/2009 | Cyr | H02M 3/33561 307/31 |
| 2009/0116269 A1 | 5/2009 | Yegnashankaran et al. | |
| 2009/0219000 A1 | 9/2009 | Yang | |
| 2009/0284991 A1 * | 11/2009 | Nishikawa | 363/21.02 |
| 2010/0011234 A1 * | 1/2010 | Malik et al. | 713/323 |
| 2010/0039836 A1 * | 2/2010 | Gong | H02M 3/156 363/21.13 |
| 2011/0133103 A1 | 6/2011 | Folkesson | |
| 2012/0170166 A1 * | 7/2012 | Nagasawa et al. | 361/92 |
| 2012/0314454 A1 * | 12/2012 | Hosotani | 363/21.01 |
| 2015/0029762 A1 * | 1/2015 | Lu et al. | 363/21.17 |

FOREIGN PATENT DOCUMENTS

| | | |
|---|---|---|
| JP | 2010057207 | 3/2010 |
| WO | WO2012113396 | 8/2012 |

OTHER PUBLICATIONS

French Search Report dated Oct. 23, 2012.
AN-8, Linfinity Appication Note: "Hiccup Mode Current Limiting", Linfinity Microelectronics, 1998.

* cited by examiner

SWITCH MODE POWER SUPPLY MODULE AND ASSOCIATED HICCUP CONTROL METHOD

This application claims the benefit, under 35 U.S.C. §119 of FR Patent Application 1251274, filed 10 Feb. 2012.

1. DOMAIN OF THE INVENTION

The invention relates to the domain of switch mode power supply modules and more specifically to integrated power supply.

2. PRIOR ART

Traditionally, when an external power supply module is used (commonly called DC-PACK or DC power block), the operating mode corresponding to the lowest consumption is implemented when the connection with the load is cut (load disconnected or switch in the open position). When the external power supply module is connected to the mains, a residual consumption remains.

The commercialization of electronic equipment today requires compliance with power consumption directives.

Thus in Europe the EC/278/2009 directive requires a level of power consumption less than 0.3 W for power supplies delivering a nominal power less than 51 W.

Theoretically, power supplies using PFM (Pulse Frequency Modulation) mode should be able to attain a consumption less than 100 mW by using application specific integrated circuits. But traditionally, the no-load residual consumption is in the order of 150 mW.

It is necessary to reduce this average residual consumption further, notably to satisfy the constraints of the set of directives at international level, such as the COC (Code of Conduct) or EUP (Energy Using Product).

The patent application US 2011/0103103 (published under the name "Power supply with low power consumption Hiccup stand-by operation") describes a switch mode power supply using a hiccup operation. This means that in the absence of load, and in order to limit the residual power consumption, the switching operation is interrupted for a certain time then restarts. The detection of absence of load is however not autonomous and the switching operation is controlled using a control signal set up by the powered equipment connected to the switch mode power supply.

This solution has the disadvantage of requiring built-in intelligence on the powered equipment to control the no-load mode and a specific conductor or a mode of communication by current or voltage modulation between the power supply module and the powered equipment.

3. SUMMARY OF THE INVENTION

The invention enables at least one of the disadvantages of the prior art to be resolved by enabling automatically and autonomously the input and the output in a no-load mode with intermittent interruption of the switching operation, and by authorizing a low residual consumption without recourse to control from the powered equipment (signal or message).

More specifically, the invention relates to a method for controlling the switching operation in a switch mode power supply module, the switch mode power supply module being intended to supply power to an item of equipment via the intermediary of two conductors, the method comprising the steps of:

measuring, by a measurement module, in the switch mode power supply, the load current,
comparing, by a comparator module, the measured load current with a predefined load current threshold value, and,
if the measured load current is less than the predefined load current threshold value for a first period of time, control, by a controller circuit, of the switching operation of the switch mode power supply module by iterative activations and deactivations of the switching operation until the measured value of the load current is greater than the predefined load current threshold value for a second period of time.

According to an embodiment of the invention, the first period of time is defined by a time constant of an anti-transient filter.

According to an embodiment of the invention, the second period of time is defined by a time constant of a filter circuit of the power supply.

According to a variant, the second period of time is defined by the time constant of a bulk capacitor specific to the secondary of the power supply.

According to an embodiment of the invention, the step of measuring the load current comprises generating a voltage proportional to an average rectified voltage at the terminals of a secondary winding of the switch mode power supply module.

The invention also relates to a device for controlling the switching operation in a switch mode power supply module, the switch mode power supply module being intended to supply power to an item of equipment via the intermediary of two conductors, the device comprising:

a circuit for measuring the load current,
a circuit for comparing said measured load current with a predefined load current threshold value, and,
a circuit for controlling the switching operation cyclically interrupting the switching operation if the measured load current is less than the predefined load current threshold value for a first period of time and sustaining the switching operation if the measured load current is greater than the predefined load current threshold value for a second period of time.

According to an embodiment of the invention, the first period of time is defined by a time constant of an anti-transient filter of the device.

According to an embodiment of the invention, the second period of time is defined by a time constant of a filter circuit of the switch mode power supply.

According to a variant, the second period of time is defined by the time constant of a bulk capacitor specific to the secondary of the power supply.

According an embodiment of the invention, the circuit for measuring the load current comprises a circuit for generating a voltage proportional to an average rectified voltage at the terminals of a secondary winding of the switch mode power supply module.

4. LIST OF FIGURES

The invention will be better understood, and other specific features and advantages will emerge upon reading the following description, the description making reference to the annexed drawings wherein.

5. DETAILED DESCRIPTION OF THE EMBODIMENTS OF THE INVENTION

In FIGS. 1 to 5, the modules shown are functional units that may or may not correspond to physically distinguishable units. For example, these modules or some of them are grouped together in a single component, or constitute functions of the same software. On the contrary, according to other embodiments, some modules are composed of separate physical entities.

In the present document, the terms "cyclically interrupting the switching operation" or "even interrupting the switching operation" should not be associated to the interval of time when between two consecutive pulses of the switching control in a Pulse Width Modulation (PWM) mode (time between two consecutive pulses when the frequency of pulses in PWM is very low). It should also not be interpreted as the interval of time when, in case of a very low load current, some pulses are removed as already known in the prior art.

The terms "interrupting the switching" correspond to a state in which the switching control pulses are not generated and the circuit used for the pulse generation is controlled in order to do so.

Figure 1:
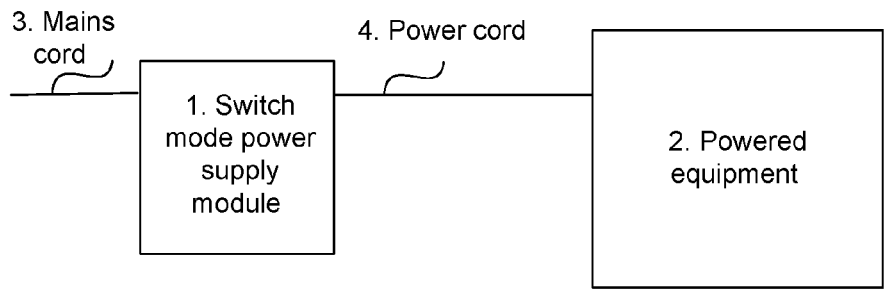
FIG. 1 shows a switch mode power supply for supplying power to a separate item of equipment.

FIG. 1 shows an item of electrical or electronic equipment 2 powered by a switch mode power supply module 1 according to an embodiment of the invention. The switch mode power supply module 1 is connected to the electrical network, also called "mains", via the intermediary of a mains cord 3. The voltage required for the proper operation of the powered equipment 2, delivered by the power supply module 1, is supplied via the intermediary of a power cord 4. The power cord 4 comprises two conductors. The measurement of the load current, which is the current consumed by the powered equipment 2, is carried out inside the switch mode power supply module 1. It is consequently not necessary to use a control signal or message to move from one operation mode to another, the switch mode power supply module 1 being autonomous and based on the measured consumption of the powered equipment 2.

Figure 2:
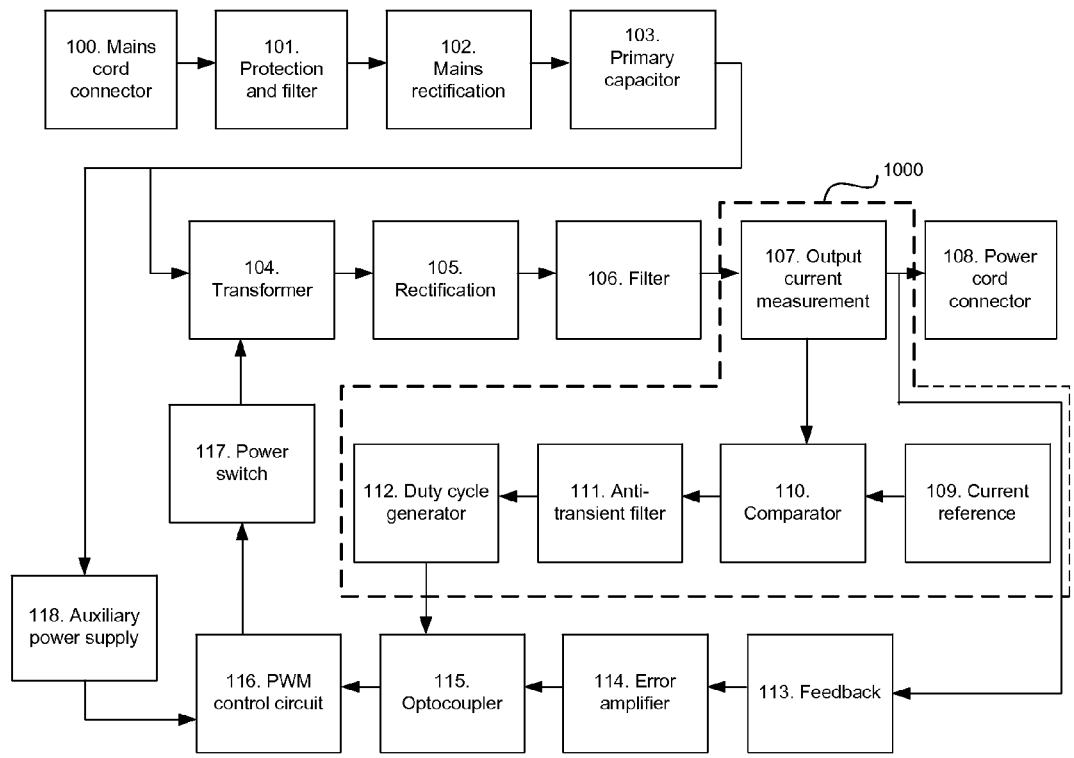
FIG. 2 shows the architecture of the switch mode power supply shown in FIG. 1.

FIG. 2 is a simplified block diagram showing the architecture of the switch mode power supply module 1 shown in FIG. 1 according to an embodiment of the invention. The architecture of the power supply module corresponds to a standard switch mode power supply architecture to which is attached a circuit for measuring the load current and for controlling the switching operation 1000 according to an embodiment of the invention. The circuit for measuring the load current and for the controlling operation 1000 corresponds to the assembly of output current measuring 107, current reference 109, comparator 110, anti-transient filter 111 and duty cycle generator 112 modules. The mains voltage is supplied to the switch mode power supply module 1 by connecting a mains cord or by connector adapted to the mains connections (compatible with a wall socket, for example), removable or fixed, to the connector 100 which comprises two connection points, one for a phase conductor, the other for a neutral conductor. The mains voltage is transmitted to the protection and filter module 101 which comprises a fuse and an electromagnetic compatibility filter. The module 101 also comprises means for lightning and overvoltage protection. The filtered voltage from the protection and filter module 101 is then rectified by the mains rectification module 102 and keeps a primary bulk capacitor of the module 103 charged. An auxiliary power supply module 118 enables power to be supplied to the PWM (Pulse Width Modulation) control circuit 116 responsible for the switching operation. This module also manages the PFM mode which reduces the low-load and no-load consumption. The rectified and filtered mains voltage available at the primary capacitance module 103 is also applied to the primary of a transformer comprised in the transformer module 104 according to the enable state of a power switch module 117. The transformer of the transformer module 104 delivers a secondary voltage to the terminals of a secondary winding according to the modes of switching operation induced by the switching operation control module 116 and the power switch module 117. This secondary voltage is rectified and filtered by the rectification module 105 and filter module 106 respectively. The voltage thus rectified is applied to a module for measuring the load current 107 whose output voltage is available in the two-point power cord connector 108 to which is connected one end of the power cord 4; the other end of the power cord 4 being connected to the powered equipment 2. The feedback loop, necessary for the servo-control of the voltage delivered, is constituted by a feedback module 113, a current reference module 109, an error amplifier 114 and an optocoupler 115. The reference module 119 corresponds to the setpoint of the servo system. The error amplification module 114 delivers at input of the optocoupler module 115 a signal proportional to the error resulting from comparing the voltages delivered by modules 113 and 119. The optocoupler module 115 ensures the necessary galvanic isolation between the primary and secondary parts of the power supply. The output of the optocoupler is connected to the PWM control circuit 116 which controls the switching operation via the intermediary of the power switch module 117. The optocoupler 115 therefore enables servo information to be transmitted to the control circuit 116 while guaranteeing galvanic isolation.

The set of the functional modules corresponds to the standard architecture of a switch mode power supply, well known to those skilled in the art.

The switch mode power supply module 1 shown on FIG. 2 comprises a circuit for measuring the load current and for the controlling operation, integrated and autonomous, 1000, according to the embodiment of the invention.

The module 1000 comprises the output current measuring module 107, the current reference module 109, the comparator module 110, the filter module 111 and the duty cycle generator module 112.

The result of measuring the current is compared with the current reference 109 by the comparator 110. The result of this comparison is filtered by the anti-transient filter 111 which enables the fast transients to be filtered.

The result of the filtering operation is transmitted to the module 112 which carries out the saturation of the optocoupler with a view to stopping the power supply (stopping the switching operation).

Figure 3:
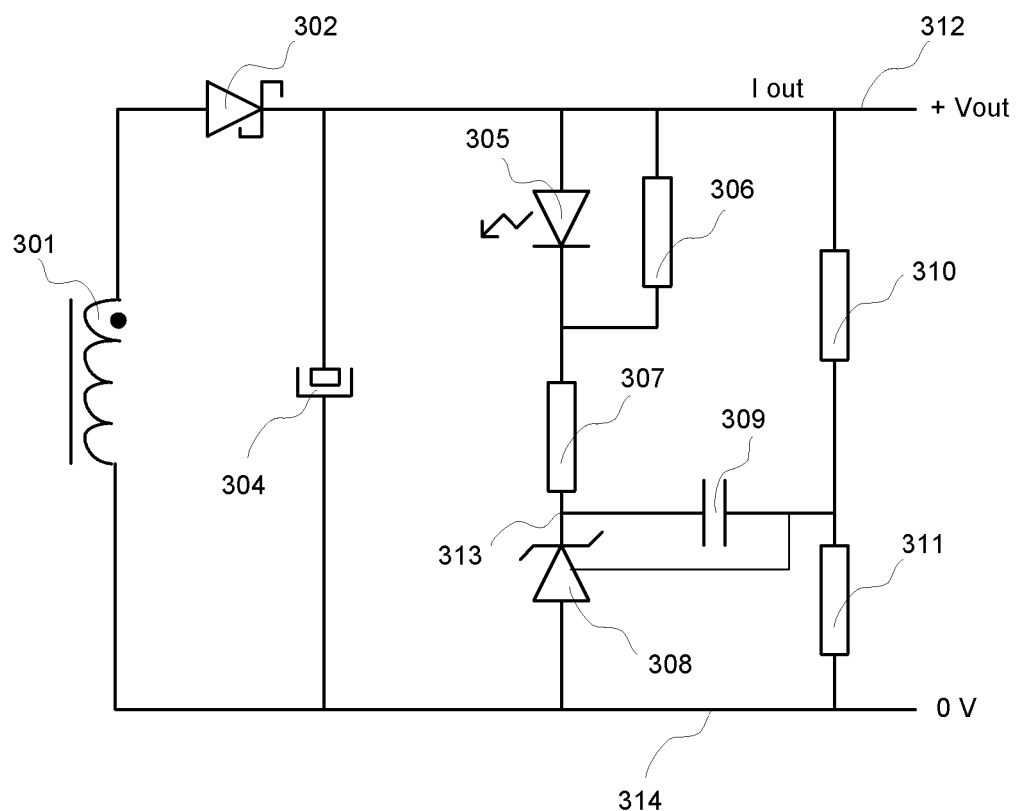
FIG. 3 shows the secondary part of a switch mode power supply, without circuit for measuring the load current.
Figure 4:
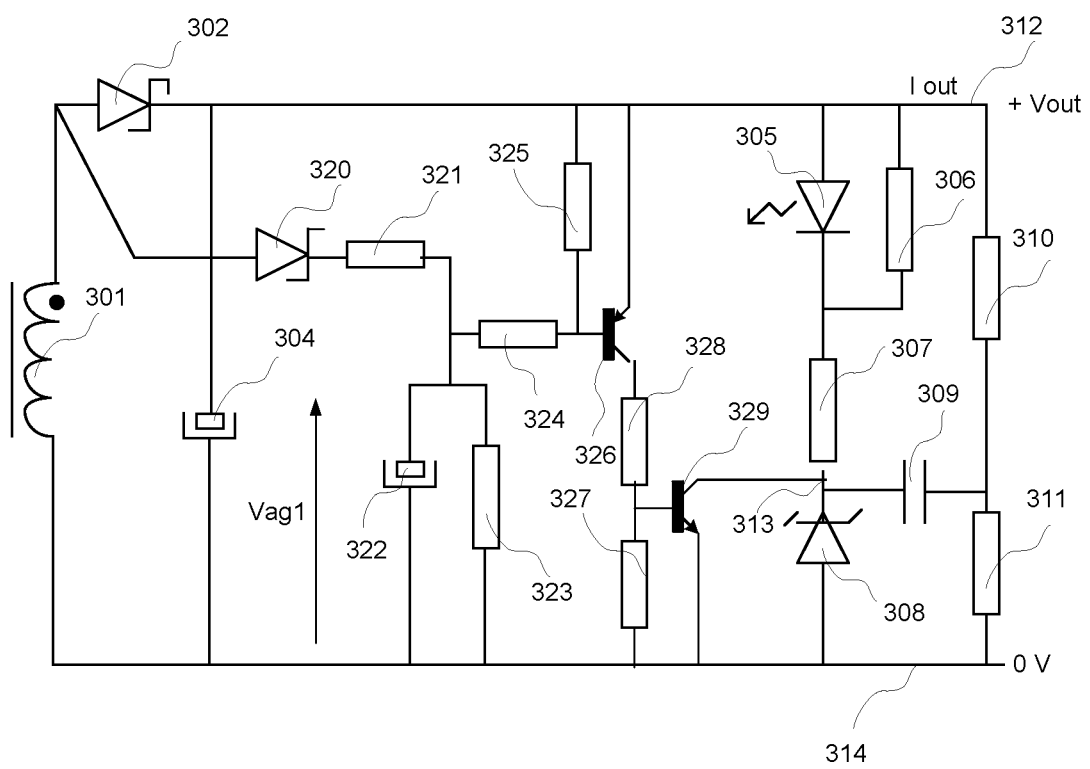
FIG. 4 shows the secondary part of a switch mode power supply comprising an autonomous circuit for measuring the load current, according to an embodiment of the invention.
Figure 5:
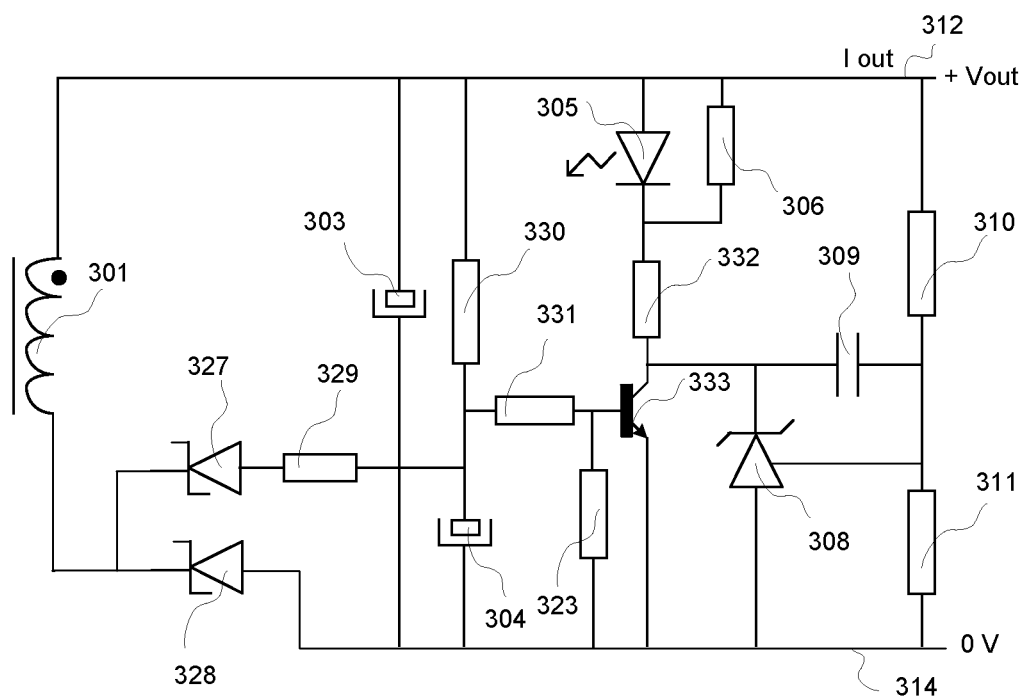
FIG. 5 shows the secondary part of a switch mode power supply comprising an autonomous circuit for measuring the load current, according to a variant of the embodiment of the invention.

FIG. 3 shows the secondary circuit of the switch mode power supply module without the circuits for measuring the load current and controlling the switching operation in hiccup mode in the preamble of the description of FIGS. 4 and 5. The configuration of the switch mode power supply module 1 in "hiccup" mode is performed, according to the embodiment of the invention, by short-circuiting the shunt regulator 308 used for regulating the output voltage +Vout available between the points 312 (potential +Vout) and 314 (potential 0V). The effect of a short-circuit between the terminals of the regulator 308 is to completely saturate the input of the optocoupler 115 and to ground the PWM control pin of the PWM control circuit 116, which is equivalent to interrupting the switching operation and dropping the output voltage +Vout.

FIG. 4 shows the details of implementing the measuring and controlling circuit 1000 integrated in the switch mode power supply module 1 according to the embodiment of the invention.

The current measuring circuit 107 enables detection of a very low load current (Iout) without however having recourse to the use of resistive components or a low-noise precision comparator. This is with the purpose of limiting Joule effect losses and saving power consumption, notably at high power. The current measuring circuit 107 uses a connection on a winding 301 of the secondary of the transformer and a small value resistor 321 to generate an average voltage Vag1 (at the terminals of components 322 and 323) directly proportional to the output current Iout. The proportionality of the voltage Vag1 and the output current Iout follows from the fact that the duty cycle of the voltage transmitted to the primary of the transformer 104 (and therefore to the secondary 301, via the intermediary of the magnetic circuit of the transformer 104) depends directly on the load present at the power supply output. This is the operating principle of the switch mode power supply. To obtain the image of the consumed current, the rectification circuit (constituted of the diode 320) and integration circuit (constituted of components 321, 322 and 323) averages the voltage available at the terminals of the secondary winding 301.

The average voltage Vag1 is then compared to a reference voltage to control a short-circuit at the terminals of the shunt regulator 308 when the difference between the output voltage +Vout and average voltage reaches a predetermined threshold. According to the embodiment, the reference voltage is supplied by the base emitter junction of the transistor 326.

The transistor 326 then becomes saturated when its base emitter voltage is such that a base current can flow. The saturated transistor 326 then works as a closed switch which consequently enables the saturation of the transistor 329. The saturated transistor 329 short-circuits the shunt regulator 308, which leads to a complete saturation of the light-emitting diode (LED) 305 of the optocoupler. The values of the resistors 324 and 325 enable the predetermined current threshold value to be defined. According to the embodiment of the invention, the current is not measured directly, but via the intermediary of its voltage image.

According to a variant, the current is measured directly, using a current measuring resistor, for example, although this solution is more costly and dissipates more power.

When the switching operation is interrupted, the output voltage Vout of the switch mode power supply module 1 decreases progressively since the power stored in the bulk capacitor 304 is progressively consumed by the different components of the circuits (principally by the saturation of the diode of the optocoupler 305). When the power stored in the bulk reservoir 304 is no longer sufficient to saturate the LED diode 305 of the optocoupler, the PWM control circuit which controls the switching operation reactivates the switching operation and the power supply becomes operational again. The voltage +Vout at the terminals of the bulk capacitor 304 increases again and measuring the current enables, if necessary, the switching operation to be interrupted again. This operating cycle is repeated at a frequency depending notably on the value of the bulk capacitor 304.

The duty cycle of the hiccup mode defines the ratio of the period wherein the switching operation is active to the complete cycle period. According to the embodiment of the invention, it is possible to achieve a ratio of up to 1/24. The hiccup period can be more than twelve seconds. The residual consumption when no load is detected or at very low load can be divided by 3, or even more.

The circuit shown in FIG. 4, for example, enables a threshold in the order of 10 mA to be defined below which the power supply moves to hiccup mode and wherein the switching operation is controlled in order to be interrupted and reactivated cyclically.

The circuit shown in FIG. 4 describes a device enabling control of the switching operation in the switch mode power supply module 1 intended to supply power to the equipment 2 via the intermediary of two conductors and without recourse to a control signal or a control message from the equipment 2. The method use comprises the measurement by the device 1000, in the switch mode power supply module 1, of the load current (current delivered, at the power supply output, to the equipment 2) and the comparison of the measured load current with a predefined load current threshold value. According to this method, in the event that the measured load current is less than a predefined load current threshold value for a first period of time, control of the switching operation of the switch mode power supply module effects iterative (cyclical) activations and deactivations of the switching operation until the measured value of the load current is greater than the predefined load current threshold value again, for a second period of time.

The predefined threshold value and the first and the second periods of time are defined during circuit design, notably by defining the values of the electronic components of the circuit.

According to the embodiment of the invention, the first period of time is defined by at least one time constant of an anti-transient filter, such as for example the R-C filter constituted of components 309 and 310 or the R-C filter constituted of components 321 and 322. According to an embodiment of the invention, the second period of time is defined by a time constant of a filter circuit of the power supply, such as for example, the secondary capacitor 304 of FIG. 4.

According to a variant, the second period of time is defined by the time constant of a bulk capacitor specific to the secondary of the power supply, such as for example the bulk capacitor 304 of FIG. 4.

According an embodiment of the invention, measuring the load current uses the generation of a voltage proportional to an average rectified voltage at the terminals of a secondary winding of the switch mode power supply module 1, such as for example, the voltage Vag1.

FIG. 5 shows a variant of the current measuring circuit shown in FIG. 4 which enables the number of components used to be reduced while operating according to the same principle as the circuit shown in FIG. 4.

Figure 6:
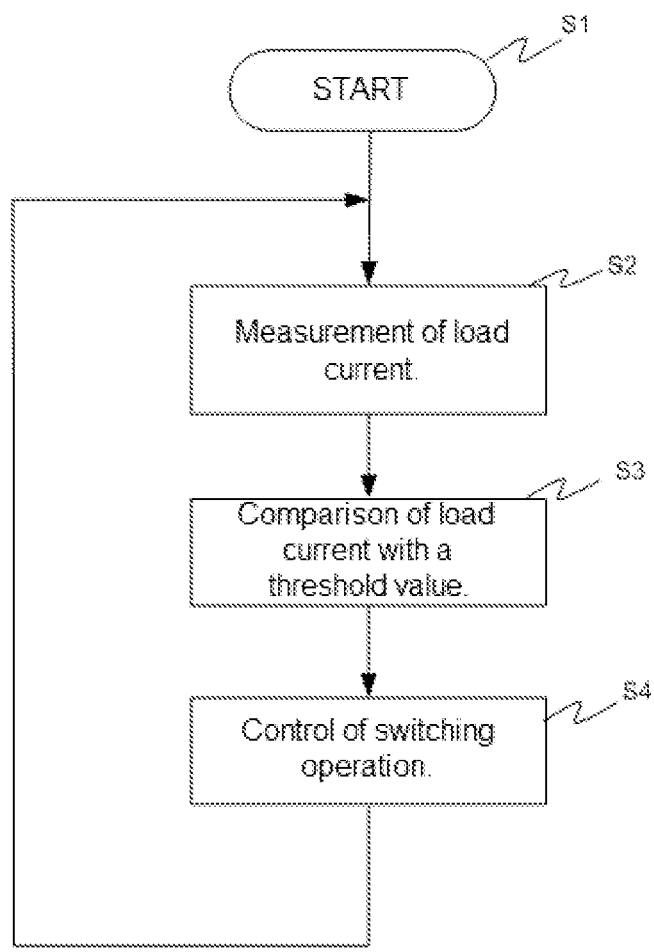
FIG. 6 is a functional diagram which shows the method for controlling the switching operation of the power supply module.

FIG. 6 shows the method for controlling the switching operation in the power supply module according to an embodiment of the invention.

Step S1 corresponds to the initial state, in stable mode, after switching on the switch mode power supply module. Step S2 corresponds to measuring the load current delivered by the switch mode power supply module 1 to the powered equipment 2. The measurement is carried out, according to the embodiment of the invention, by the module 107 shown in FIG. 2.

Step S3 corresponds to the comparison of the measured current by the module 107 with a current reference. The current reference is delivered by the current reference module 109 according to an embodiment of the invention. The comparison is carried out by the comparator module 110 shown in FIG. 2.

Step S4 corresponds to controlling the switching operation. According to whether the value of the load current Iout, delivered by the switch mode power supply module 1 to the powered equipment 2 is smaller or larger than a predefined load current threshold, control of the switching operation is carried out differently (notably by modules 111, 112, 115, 116 and 117 shown in FIG. 2). This means that when the measured load charge is less than the predefined current threshold, the switching operation is interrupted cyclically in order to save power. Furthermore, when the load current is greater than the predefined load current threshold, the switching operation is continuous.

Naturally, the invention is not limited to the embodiment previously described. The invention also relates to all load current measuring circuits, integrated in the power supply module, capable of operating autonomously without recourse to a control signal or message, with a view to controlling the switching operation for the purpose of reducing power consumption where there is no load or a very low load.

The invention claimed is:

1. A switch mode power supply, comprising:
    a transformer having a winding;
    a power switch responsive to a switch mode control signal and coupled to said transformer for producing periodic voltage pulses in said transformer such that, in a normal load mode of operation, switching operation in said power switch is uninterrupted;
    a first rectifier coupled to said transformer for rectifying said periodic voltage pulses to produce a first rectified voltage that is coupled to a load circuit, said first rectified voltage producing a load current in said load circuit;
    a second rectifier coupled to said transformer for rectifying periodic voltage pulses in said winding to produce second rectified voltage pulses at an output of said second rectifier such that an average value of said second rectified voltage pulses at said second rectifier output is indicative of said load current in the normal load mode of operation;
    a control circuit responsive to said first rectified voltage for generating said switch mode control signal that is coupled to said power switch to regulate said first rectified voltage;
    a sensor coupled to said second rectifier output for sensing said average value of said second rectified voltage pulses to generate an output signal; and
    a comparator coupled to said sensor and responsive to said sensor output signal, the comparator further coupled to said power switch for cyclically disabling said power switch from producing said periodic voltage pulses in said transformer when said magnitude of said sensor output signal is less than a threshold of the comparator.

2. The switch mode power supply according to claim 1, wherein said switch mode power supply operates in pulse-width modulation (PWM) mode.

3. The switch mode power supply according to claim 1, wherein said sensor comprises a resistor and a capacitor.

4. The switch mode power supply according to claim 1 wherein said winding is a secondary winding of said transformer.

5. The switch mode power supply according to claim 1, wherein said comparator cyclically disables said power switch from producing said voltage pulses in said transformer, when said sensor output signal stays below said threshold during a first period of time.

6. The switch mode power supply according to claim 5, wherein said first period of time is defined by time constants of an anti-transient filter.

7. The switch mode power supply according to claim 1, wherein said comparator cyclically disables said power switch from producing said voltage pulses in said transformer during a second period of time defined by a time constant of a filter circuit of the power supply.

8. The switch mode power supply according to claim 7, wherein said second period of time is defined by a time constant of a bulk capacitor, said bulk capacitor delivering power available at terminals of said winding during said producing.

9. The switch mode power supply according to claim 1, wherein said output signal generated by said sensor is an averaged signal representative of a duty cycle of said switch mode control signal.

10. The switch mode power supply according to claim 1 wherein said output signal is generated via a signal path that excludes a load power path formed in said load circuit and between said transformer and said load circuit.

11. The switch mode power supply according to claim 1, wherein said comparator comprises a comparator output switch to disable said power switch by providing power stored in a capacitor of said first rectifier to a light emitting diode of said power switch to cause said light emitting diode of said power switch to emit light and disable said power switch until said power stored in said capacitor of said first rectifier is no longer sufficient for emitting light by said light emitting diode of said power switch.

12. A method of cyclically interrupting switching operation in a switch mode power supply that includes a transformer having a winding, said transformer being coupled to a power switch responsive to a switch mode control signal, said method comprising:
    producing periodic voltage pulses in said transformer due to said power switch such that, in a normal load mode of operation, switching operation in said power switch is uninterrupted;
    rectifying said periodic voltage pulses to produce a first rectified voltage that is coupled to a load circuit, said first rectified voltage producing a load current in said load circuit;
    rectifying of said periodic voltage pulses in said winding to produce second rectified voltage pulses at an output of a second rectifier such that an average value of said second rectifier voltage pulses at said second rectifier output is indicative of said load current in the normal load mode of operation;
    generating said switch mode control signal that is coupled to said power switch to regulate said first rectified voltage;

sensing said average value of said second rectified voltage pulses to generate in response to said second rectifier voltage pulses an output signal; and cyclically disabling said power switch from producing said periodic voltage pulses in said transformer when said magnitude of said output signal is less than a threshold of the comparator.

13. The method according to claim 12 further comprising, operating said switch mode power supply in pulse-width modulation (PWM) mode.

14. The method according to claim 12 wherein said cyclically disabling said power switch from producing said periodic voltage pulses in said transformer is performed when said sensor output signal stays below said threshold during a first period of time.

15. The method according to claim 14, wherein said first period of time is defined by time constants of an anti-transient filter.

16. The method according to claim 14, wherein said disabling is performed during a second period of time defined by a time constant of a filter circuit of the power supply.

17. The method according to claim 16, wherein said second period of time is defined by a time constant of a bulk capacitor, said bulk capacitor delivering power available at terminals of said winding during said producing.

18. The method according to claim 12 wherein said winding is a secondary winding of said transformer.

19. The method according to claim 12 wherein said output signal generated by said sensor is an averaged signal representative of a duty cycle of said switch mode control signal.

20. The method according to claim 12 wherein said output signal is generated via a signal path that excludes a load power path formed in said load circuit and between said transformer and said load circuit.

21. The method according to claim 12 wherein said disabling comprising providing power stored in a capacitor of a first rectifier of said power switch to a light emitting diode of said power switch to cause said light emitting diode of said power switch to emit light and disable said power switch until said power stored in said capacitor of said first rectifier is no longer sufficient for emitting light by said light emitting diode of said power switch.

22. A switch mode power supply, comprising:

a transformer having a winding;

a power switch responsive to a switch mode control signal and coupled to said transformer for producing periodic voltage pulses in said transformer such that, in a normal load mode of operation, switching operation in said power switch is uninterrupted;

a first rectifier connected to said winding of said transformer for rectifying said periodic voltage pulses to produce a first rectified voltage that is coupled to a load circuit, said first rectified voltage producing a load current in said load circuit;

a second rectifier connected to said winding of said transformer for rectifying periodic voltage pulses in said winding to produce second rectified voltage pulses at an output of said second rectifier such that an average value of said second rectified voltage pulses at said second rectifier output is indicative of said load current in the normal load mode of operation;

a control circuit responsive to said first rectified voltage for generating said switch mode control signal that is coupled to said power switch to regulate said first rectified voltage;

a sensor connected to said second rectifier output for sensing said average value of said second rectified voltage pulses to generate an output signal; and a comparator connected to said sensor and responsive to said sensor output signal, the comparator further coupled to said power switch for cyclically disabling said power switch from producing said periodic voltage pulses in said transformer when said magnitude of said sensor output signal is less than a threshold of the comparator.

* * * * *